(12) United States Patent
Goldberg

(10) Patent No.: US 7,627,052 B2
(45) Date of Patent: *Dec. 1, 2009

(54) PATTERN DIVERSITY TO SUPPORT A MIMO RECEIVER AND ASSOCIATED METHODS

(75) Inventor: Steven J. Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/326,042

(22) Filed: Jan. 5, 2006

(65) Prior Publication Data

US 2006/0198343 A1    Sep. 7, 2006

Related U.S. Application Data

(63) Continuation-in-part of application No. 11/233,329, filed on Sep. 22, 2005.

(60) Provisional application No. 60/612,546, filed on Sep. 23, 2004, provisional application No. 60/612,435, filed on Sep. 23, 2004, provisional application No. 60/612,433, filed on Sep. 23, 2004, provisional application No. 60/612,550, filed on Sep. 23, 2004, provisional application No. 60/612,632, filed on Sep. 23, 2004, provisional application No. 60/612,548, filed on Sep. 23, 2004, provisional application No. 60/612,471, filed on Sep. 23, 2004, provisional application No. 60/612,551, filed on Sep. 23, 2004, provisional application No. 60/612,469, filed on Sep. 23, 2004, provisional application No. 60/612,547, filed on Sep. 23, 2004, provisional application No. 60/615,338, filed on Oct. 1, 2004, provisional application No. 60/615,260, filed on Oct. 1, 2004, provisional application No. 60/620,775, filed on Oct. 20, 2004, provisional application No. 60/620,776, filed on Oct. 20, 2004, provisional application No. 60/620,862, filed on Oct. 20, 2004, provisional application No. 60/621,113, filed on Oct. 22, 2004, provisional application No. 60/639,223, filed on Dec. 23, 2004.

(51) Int. Cl.
H04B 7/02 (2006.01)

(52) U.S. Cl. .................................. 375/267; 375/135

(58) Field of Classification Search ................ 375/267, 375/141, 144, 148, 219, 220, 299, 349
See application file for complete search history.

(56) References Cited

U.S. PATENT DOCUMENTS

| 6,473,036 B2 | 10/2002 | Proctor, Jr. .................. 342/372 |
| 6,760,388 B2 | 7/2004 | Ketchum et al. ............. 375/295 |
| 6,799,170 B2 | 9/2004 | Lee et al. ...................... 706/20 |

(Continued)

*Primary Examiner*—Emmanuel Bayard
(74) *Attorney, Agent, or Firm*—Allen, Dyer, Doppelt, Milbrath & Gilchrist, P.A.

(57) ABSTRACT

A MIMO communications system includes a transmitter, and a transmit antenna array connected to the transmitter and having M antenna elements for transmitting M source signals. A receive antenna array is connected to a receiver and has N antenna elements for receiving at least M different summations of the M source signals, with N being less than M. A signal separation processor is connected to the receiver for forming a mixing matrix that includes the at least M different summations of the M source signals so that the mixing matrix has a rank equal to at least M. The signal separation processor separates desired source signals from the mixing matrix.

31 Claims, 4 Drawing Sheets

U.S. PATENT DOCUMENTS

| | | | |
|---|---|---|---|
| 6,870,515 B2 | 3/2005 | Kitchener et al. | 343/853 |
| 6,931,362 B2 | 8/2005 | Beadle et al. | 702/190 |
| 7,265,714 B2 * | 9/2007 | Goldberg | 342/378 |
| 7,342,970 B2 * | 3/2008 | Liu | 375/259 |
| 7,362,269 B2 * | 4/2008 | Goldberg et al. | 342/378 |
| 2003/0050020 A1 * | 3/2003 | Erceg et al. | 455/101 |
| 2004/0047426 A1 | 3/2004 | Nissensohn | 375/259 |
| 2004/0192216 A1 * | 9/2004 | Marzetta et al. | 455/67.14 |
| 2004/0198450 A1 | 10/2004 | Reilly et al. | 455/562.1 |
| 2007/0153744 A1 * | 7/2007 | Goldberg | 370/334 |
| 2007/0202919 A1 * | 8/2007 | Shu et al. | 455/562.1 |
| 2008/0095260 A1 * | 4/2008 | Vaidyanathan | 375/267 |
| 2008/0144594 A1 * | 6/2008 | Yano et al. | 370/342 |

* cited by examiner

US 7,627,052 B2

PATTERN DIVERSITY TO SUPPORT A MIMO RECEIVER AND ASSOCIATED METHODS

RELATED APPLICATION

The present application is a continuation-in-part of U.S. patent application Ser. No. 11/233,329 filed Sep. 22, 2005 which claims the benefit of U.S. Provisional Application Ser. Nos. 60/639,223 filed Dec. 23, 2004; 60/621,113 filed Oct. 22, 2004; 60/620,775 filed Oct. 20, 2004; 60/620,776 filed Oct. 20, 2004; 60/620,862 filed Oct. 20, 2004; 60/615,338 filed Oct. 1, 2004; 60/615,260 filed Oct. 1, 2004; 60/612,546 filed Sep. 23, 2004; 60/612,435 filed Sep. 23, 2004; 60/612,433 filed Sep. 23, 2004; 60/612,550 filed Sep. 23, 2004; 60/612,632 filed Sep. 23, 2004; 60/612,548 filed Sep. 23, 2004; 60/612,471 filed Sep. 23, 2004; 60/612,551 filed Sep. 23, 2004; 60/612,469 filed Sep. 23, 2004; and 60/612,547 filed Sep. 23, 2004 the entire contents of which are incorporated herein by reference.

FIELD OF THE INVENTION

The present invention relates to the field of communication systems, and more particularly, to a multiple-input multiple-output (MIMO) receiver operating with a compact antenna array.

BACKGROUND OF THE INVENTION

A multiple-input multiple-output (MIMO) wireless communications system includes a plurality of antenna elements at the transmitter and a plurality of antenna elements at the receiver. A respective antenna array is formed at the transmitter and at the receiver based upon the antenna elements associated therewith.

The antenna elements are used in a multi-path rich environment such that due to the presence of various scattering objects in the environment, each signal experiences multipath propagation. The receive antenna elements capture the transmitted signals, and a signal processing technique is then applied to separate the transmitted signals and recover the user data.

The signal processing technique may be a blind source separation (BSS) process. The separation is "blind" because it is often performed with limited information about the transmit signals, the sources of the transmit signals, and the effects that the propagation channel has on the transmit signals. Three commonly used blind signal separation techniques are principal component analysis (PCA), independent component analysis (ICA) and singular value decomposition (SVD).

MIMO communications systems are advantageous in that they enable the capacity of the wireless link between the transmitter and receiver to be improved. The multipath rich environment enables multiple orthogonal channels to be generated therebetween. Data for a single user can then be transmitted over the air in parallel over those channels, simultaneously and using the same bandwidth.

Current MIMO communications systems use spatially diverse antenna elements so that the number of orthogonal channels that can be formed is not reduced. The problem with such an implementation is that the performance of a MIMO communications system is usually proportional to the number of antenna elements used.

Increasing the number of antenna elements increases the size of the antenna arrays for MIMO communications systems. When a MIMO receiver is implemented within a small portable communications device, there is little available volume for a large number of antenna elements, and mounting the antenna elements on the outside of the communications devices is a problem for the user.

One approach for providing a more compact antenna array for a MIMO receiver is disclosed in U.S. Pat. No. 6,870,515. Instead of using spatially diverse antenna elements, polarization diversity is used. Since closely spaced antenna elements are used, this enables a compact antenna array to be provided for a MIMO receiver.

Even though a more compact antenna array is provided, performance of the MIMO communications system is still based on the number of antenna elements at the receiver being equal to or greater than the number of antenna elements at the transmitter. For example, the '515 patent discloses that the number of receive antenna elements is equal to or greater than the number of transmit antenna elements.

SUMMARY OF THE INVENTION

In view of the foregoing background, it is therefore an object of the present invention to reduce the number of antenna elements at a MIMO receiver as compared to the number of antenna elements at a MIMO transmitter while still providing a robust MIMO communications system.

This and other objects, features, and advantages in accordance with the present invention are provided by a MIMO communications system comprising a transmitter, and a transmit antenna array connected to the transmitter and comprising M antenna elements for transmitting M source signals.

On the receive side, a receive antenna array is connected to a receiver and comprises N antenna elements for receiving at least M different summations of the M source signals, with N being less than M. A signal separation processor may be connected to the receiver for forming a mixing matrix comprising the at least M different summations of the M source signals so that the mixing matrix has a rank equal to at least M. The signal separation processor separates desired source signals from the mixing matrix.

The signal separation processor may be a blind signal separation processor. The blind signal separation processor may separate the desired source signals from the mixing matrix based on at least one of principal component analysis (PCA), independent component analysis (ICA), and single value decomposition (SVD).

Alternatively, the signal separation processor may separate the desired source signals from the mixing matrix based on a knowledge based processing signal extraction process. The knowledge based signal separation process may separates the desired source signals from the mixing matrix based on at least one of a zero forcing (ZF) process, and a minimum mean squared estimation (MMSE) process.

The receive antenna array advantageously receives the M different summations of the M source signals with N antenna elements, wherein N<M. The N antenna elements generate at least M different antenna patterns for receiving the M different summations of the M source signals. The M different summations of the M source signals, received by the N antenna elements at the receive antenna array, are used to populate the mixing matrix so that the mixing matrix has a rank equal to at least M.

The rank of the mixing matrix determines how many signals can actually be separated. The larger the rank, the more signals can be separated. Consequently, a compact antenna array having N antenna elements, which is less than the M antenna elements in the transmit array, may be used by a MIMO receiver while still providing a robust MIMO communications system.

There are a number of different embodiments of the receive antenna array. The N antenna elements may be correlated for forming a phased array. In another embodiment, the N correlated antenna elements may comprise at least one active antenna element and up to N−1 passive antenna elements for forming a switched beam antenna. In addition, at least two of the N correlated antenna elements may have different polarizations.

Other embodiments of the receive antenna array may have a multiplier effect on the received M different summations of the M source signals. This advantageously allows the rank of the mixing matrix to be further increased without having to increase the number of N antenna elements in the receive antenna array. By increasing the rank of the mixing matrix, more signals can be separated by the blind signal separation processor.

The multiplier effect on the number of received M different summations of the M source signals may be accomplished using one or a combination of the following. Array deflection involves changing the elevation of the antenna patterns for receiving additional summations of the source signals. Path selection may be performed so that all of the summations of the source signals used to populate the mixing matrix are correlated and/or statistically independent. Signal splitting may also be used for further populating the mixing matrix. The different summation signals may be split using spreading codes, or they may be split into in-phase (I) and quadrature (Q) components.

While M linearly independent summations are the minimum necessary to support a full MIMO implementation of M transmit antenna elements, there are advantages to exceeding M. For instance, not all of the N antenna elements at the receive antenna array may be oriented to receive the M linearly independent summations. Likewise, not all of the received summations are sufficiently linearly independent.

Additionally, if there are interfering interference or noise sources, an additional mixing matrix rank may be required to separate these signals. Another advantage of separating interference or noise sources is a resultant reduction in the signal-to-noise ratio, which allows higher data rates, lower error rates, and/or decreased transmission power.

For the above two reasons it is advantageous to increase the rank of the mixing matrix higher than the M which is associated with the number of usable channels. This increase of L additional sums in additional to the usual M can provide for a more robust MIMO implementation. Depending on the means available to increase the mixing matrix, the number of receive antenna elements may still be less than the classical MIMO M, or increased to M or larger to allow the mixing matrix rank to increase to N+L>M.

Another aspect of the invention is directed to a method for operating a MIMO communications system as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
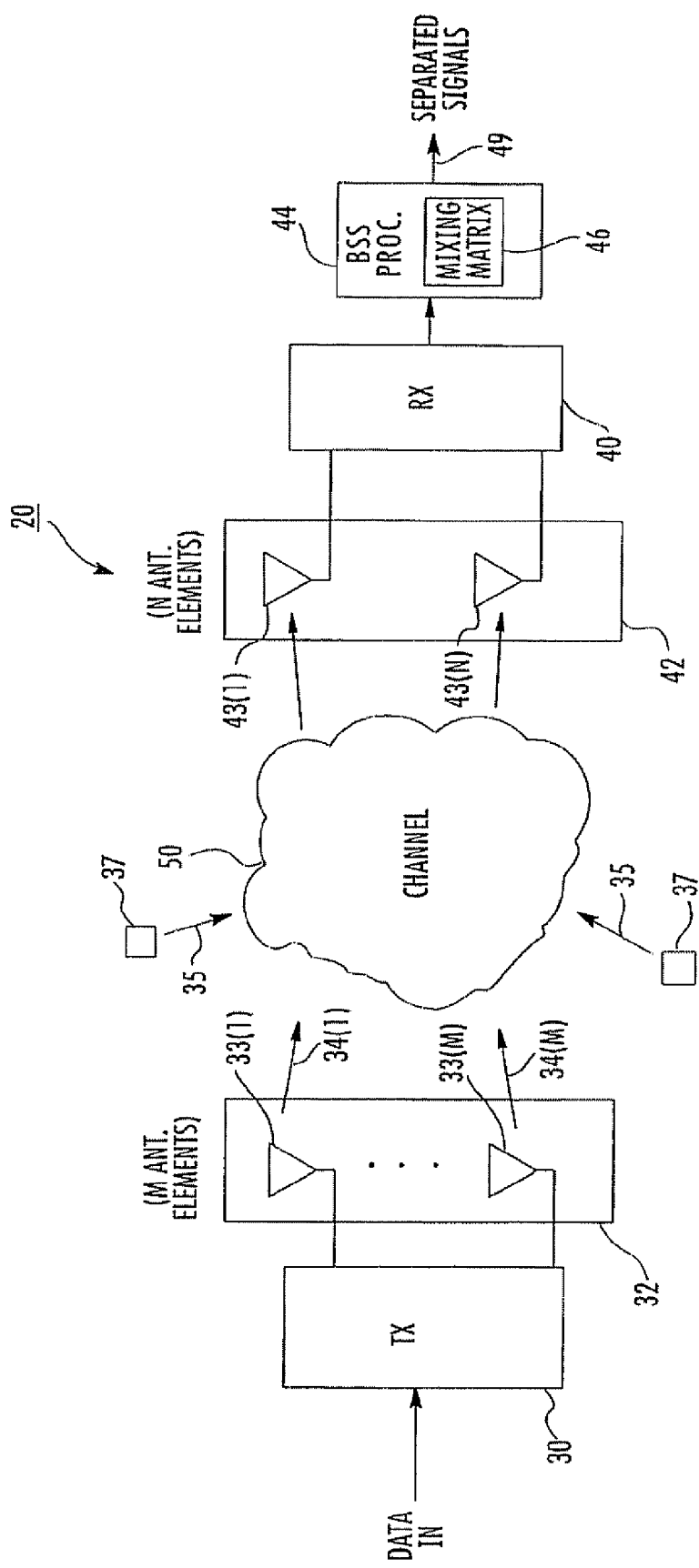
FIG. 1 is a block diagram of a MIMO communications system in accordance with the present invention.

Referring initially to FIG. 1, a MIMO communications system 20 will now be described. The MIMO communications system 20 comprises a transmitter 30, a transmit antenna array 32, a receiver 40 and a receive antenna array 42. As readily appreciated by those skilled in the art, the transmitter 30 and receiver 30 may be replaced with transceivers. Consequently, their respective antenna arrays 32, 42 support two-way data exchanges. However, for purposes of illustrating the present invention, reference will be made to a transmitter 30 and a receiver 40.

he transmit antenna array 32 includes M antenna elements 33(1)-33(M) for transmitting M source signals 34(1)-34(M). The antenna elements 33(1)-33(M) may be spatially correlated, for example. The source signals 34(1)-34(M) may be generally referred to by reference numeral 34, and the antenna elements 33(1)-33(M) may be generally referred to by reference numeral 33.

The receive antenna array 42 includes N antenna elements 43(1)-43(N) for receiving at least M different summations of the M source signals, with N being less than M. Since N<M, a compact antenna array may be used at the receiver 40 while still obtaining a robust MIMO communications system 20, as will be discussed in greater detail below. The antenna elements 43(1)-43(N) may be generally referred to by reference numeral 43.

The respective antenna arrays 32, 42 are used in a multi-path rich environment such that due to the presence of various scattering objects (buildings, cars, hills, etc.) in the environment, each signal experiences multipath propagation. Each path may be thought of as a different communications channel. Thus, reference numeral 50 in FIG. 1 represents a scattering environment resulting in multiple channels between the transmit and receive antenna arrays 32, 42. Data is transmitted from the transmit antenna arrays 32 using a space-time coding (STC) transmission method as is known in the art.

In addition to the M source signals, L interferer source signals 35 from an interferer 37 may exist within the scattering environment 50 and interfere with the separation of the desired source signals. Various means to increase the mixing matrix may be advantageously used to populate the mixing matrix beyond a rank of M, as will be discussed in greater detail below.

The receive antenna array 42 captures the M different summations of the M source signals 34 and a signal processing technique is then applied to separate the signals. A blind signal separation (BSS) processor 44 is connected to the receiver 40 for forming a mixing matrix 46 comprising the at least M different summations of the M source signals so that the mixing matrix has a rank equal to at least M. The blind signal separation processor 44 separates desired source signals from the mixing matrix 46.

As discussed in great detail in the parent patent application, three commonly used techniques that fall under blind signal separation are principal component analysis (PCA), independent component analysis (ICA), and singular value decomposition (SVD). As long as the signals are independent in some measurable characteristic, and if their signal sums are linearly independent from each other, one or more of these blind signal separation techniques may be used to separate independent or desired source signals from a mixture of the source signals. The measurable characteristic is often some combination of the first, second, third or fourth moments of the signals.

PCA whitens the signals, uses first and second moments, and rotates the data set based on correlation properties. If the signal-to-noise ratios of the source signals are high, the signal separation process can stop with PCA.

If the signal-to-noise ratios of the source signals are low, then ICA separates the source signals based on statistical attributes involving the third and fourth moments of the source signals. Some source signals are Gaussian, and their third and fourth moments are dependent on the first and second moments. A random noise source can be Gaussian, and spread spectrum signals are designed to appear Gaussian to decoders by other than their specific spreading code. Under specific conditions, an aggregate of signals can appear Gaussian due the central limit theorem. The ICA approach can separate one Gaussian signal. As an alternative to ICA and PCA, SVD separates source signals from the mixture of source signals based upon their eigenvalues.

As an alternative to a blind signal separation processor, a signal separation processor may be used for separating the desired source signals from the mixing matrix based on a knowledge based processing signal extraction process. The knowledge based signal separation process separates the desired source signals from the mixing matrix based on at least one of a zero forcing (ZF) process, and a minimum mean squared estimation (MMSE) process, for example.

Figure 2:
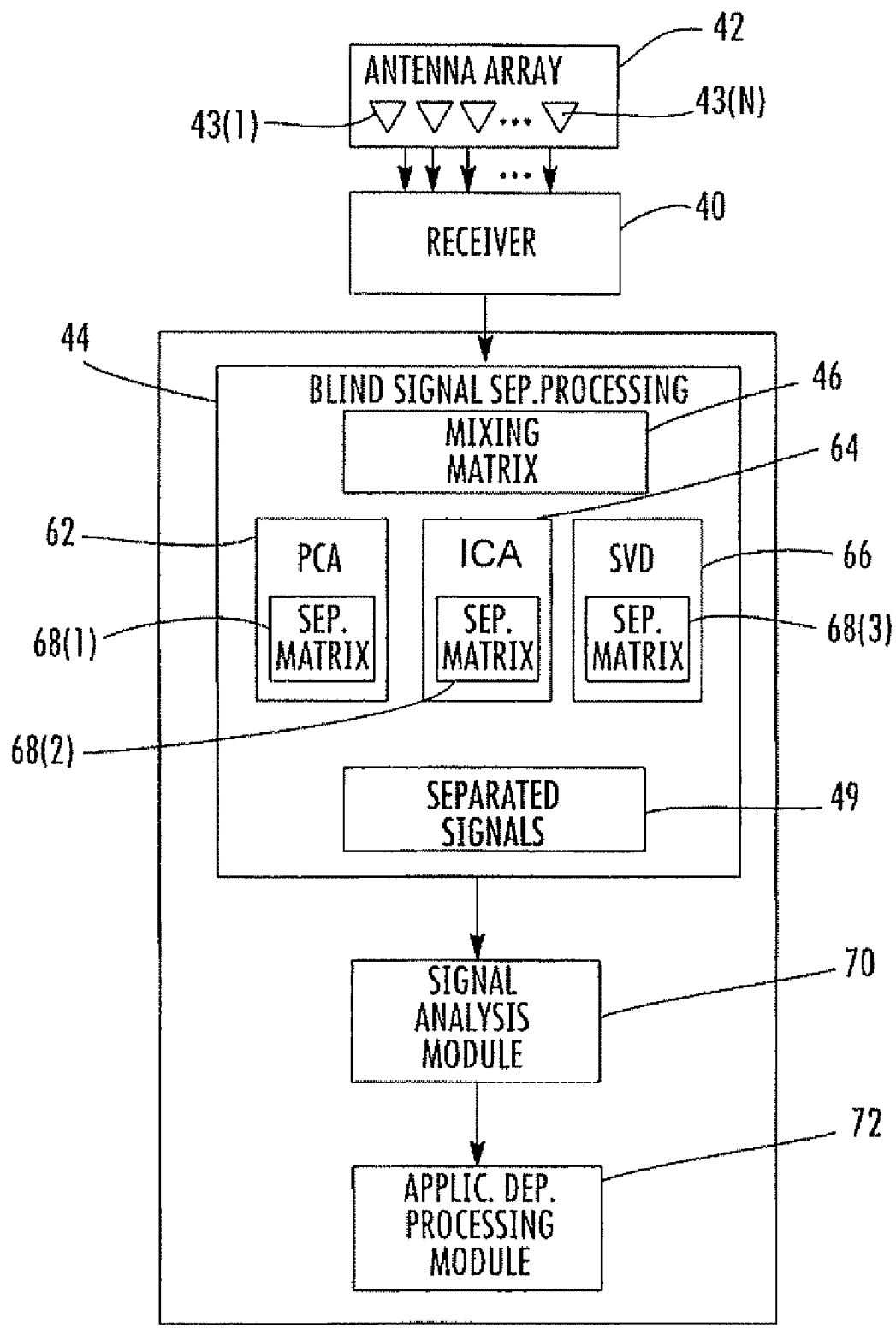
FIG. 2 is a more detailed block diagram of the elements on the receive side of the MIMO communications system as shown in FIG. 1.

The different elements on the receive side of the MIMO communications system 20 will now be discussed in greater detail with reference to FIG. 2. The receive antenna array 42 includes N antenna elements 43(1)-43(N) for receiving at least M different summations of the M source signals 34, with N and M being greater than 1 and with N being less than M. The receive antenna array 42 is not limited to any particular configuration. The receive antenna array 42 may include one or more antenna elements 43. The antenna elements 43 may be configured so that the antenna array forms a phased array or switched beam antenna, for example.

For the purpose of building the mixing matrix 46, the goal is create different sums of signals. The signals of interest can actually always be lower than the interferers in this application and still be separated. Because of this significant difference in purpose, the distances between antenna elements 43 need not be of a specific separation as is normally required by active and passive beam forming antenna arrays.

The receiver 40 is connected downstream to the receive antenna array 42 for receiving at least M different summations of the M source signals 34. A blind signal separation processor 44 is downstream to the receiver 40. Even though the processor 44 is illustrated separate form the receiver 40, the processor may also be included within the receiver. The different summations of the M source signals 34 received by the receiver 40 are used to populate the mixing matrix 46. The mixing matrix 46 is then processed by one or more blind signal separation processing modules 62, 64 and 66 within the processor 60.

The blind signal separation processing modules include a PCA module 62, an ICA module 64 and an SVD module 66. These modules 62, 64 and 66 may be configured as part of the blind signal separation processor 44. The PCA module 62 operates based on the first and second moments of the different summations of the received source signals, whereas the ICA module 64 operates based on the third and fourth moments of the same signals. The SVD module 66 performs signal separation based on the eigenvalues of the different summations of the received source signals.

The correlation processing initially performed by the PCA module 62 determines an initial separation matrix 68(1) for the different summations of the source signals, and the ICA module 64 then determines an enhanced separation matrix 68(2) for separating the source signals in the mixing matrix 46. If the signals are separated by the SVD module 66, a separation matrix 68(3) is also determined for separating the different summations of the received source signals in the mixing matrix 46.

From each respective separation matrix 68(1)-68(3), the separated signals are represented by reference number 49. The separated signals 49 then undergo signal analysis by a signal analysis module 70 to determine which signals are of interest and which signals are interferers. An application dependent processing module 72 processes the signals output from the signal analysis module 70.

The decision on which signals are of interest may not always involve the final signal to be decoded. For instance, the application may call for identifying interferers and subtracting them from the different summations of the received source signals, and then feeding the reduced signal to a waveform decoder. In this case, the signals of interest are the ones that ultimately end up being rejected.

The rank of the mixing matrix 46 determines how many signals can actually be separated. For example, a mixing matrix having a rank of 4 means that 4 source signals can be separated. Ideally, the rank of the mixing matrix 46 should at least be equal to the number of signal sources M. The larger the rank, the more signals that can be separated. As the number of sources M increases, then so does the required number of antenna elements N. The '515 patent discussed in the background section discloses that the number of antenna elements N at the receiver are equal to or greater than the number of antenna elements M at the transmitter, i.e., $N \geq M$.

The receive antenna array 42 advantageously receives the M different summations of the M source signals 34 with N antenna elements 33, wherein N<M. The N antenna elements 43 generate at least M different antenna patterns for receiving the M different summations of the M source signals. The M different summations of the M source signals 34 received by the N antenna elements 43 at the receive antenna array 42 are used to populate the mixing matrix 46 so that the mixing matrix has a rank equal to at least M.

As noted above, the rank of the mixing matrix 46 determines how many signals can actually be separated. The larger the rank, the more signals can be separated. Consequently, a compact receive antenna array 42 having N antenna elements 43, which is less than the M antenna elements 33 in the transmit antenna array 32, may be used by a MIMO receiver 40 while still providing a robust MIMO communications system 20.

While M linearly independent summations are the minimum necessary to support a full MIMO implementation of M transmit antenna elements 34, there are advantages to exceeding M. For instance, not all of the N antenna elements 43 at the receive antenna array 42 may be oriented to receive the M linearly independent summations. Likewise, not all of the received summations are sufficiently linearly independent. There may also be L other signals that degrade the signal to noise ratio in addition to the M known signal streams being separated.

Consequently, it is advantageous to take advantage of increasing the rank of the mixing matrix to M+L when possible. Another advantage of separating interference or noise sources is a resultant reduction in the signal-to-noise ratio, which allows higher data rates, lower error rates, and/or decreased transmission power.

For example, L interferer source signals 35 may exist and interfere with separation of the desired source signals 34 from the mixing matrix, with L being greater than 1. If increasing the rank of the mixing matrix has been exhausted without having to add additional antenna elements, then adding at least one additional antenna element will provide additional means to increase the rank of the mixing matrix. Adding additional elements may still leave the count of elements below M of the classical MIMO approach, or it may return the number of elements to M, or even increase it beyond M. Depending on the gains achieved by increasing the mixing matrix rank, it may still be worthwhile to do so, even though it increases the receiver antenna element count. For example, a mixing matrix of rank M+L requiring M elements will often be a superior implementation versus an M element implementation using classical processing MIMO receiver. However, for purposes of illustrating the present invention, the following discussion will focus on the M source signals.

There are a number of different embodiments of the receive antenna array 42. The N antenna elements 43 may be correlated for forming a phased array. In another embodiment, the N correlated antenna elements 43 may comprise at least one active antenna element and up to N−1 passive antenna elements for forming a switched beam antenna. In addition, at least two of the N correlated antenna elements may have different polarizations.

Other embodiments of the receive antenna array 42 have a multiplier effect on the received M different summations of the M source signals. This advantageously allows the rank of the mixing matrix 46 to be further increased without having to increase the number of N antenna elements 43 in the receive antenna array 42. By increasing the rank of the mixing matrix 46, more signals can be separated by the blind signal separation processor 44.

The multiplier effect on the number of received M different summations of the M source signals 34 may be accomplished using one or a combination of the following. Array deflection involves changing the elevation of the antenna patterns for receiving additional summations of the source signals 34. Path selection may be performed so that all of the summations of the source signals 34 used to populate the mixing matrix 46 are correlated and/or statistically independent. Signal splitting may also be used for further populating the mixing matrix 46. The different summation signals may be split using spreading codes, or they may be split into in-phase (I) and quadrature (Q) components.

Figure 3:
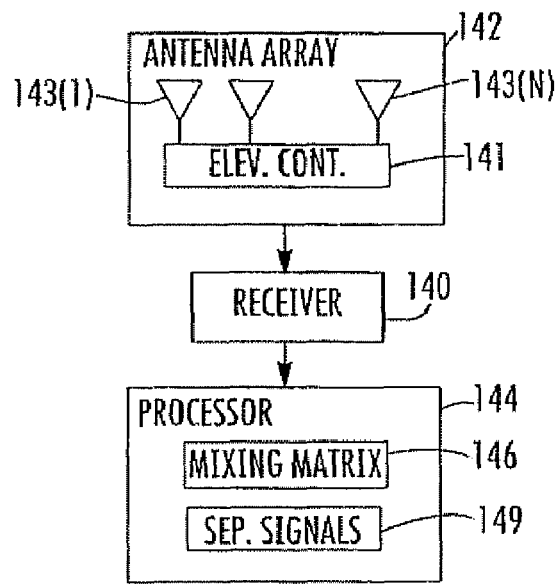
FIG. 3 is a block diagram of a MIMO receiver operating based on array deflection for providing different summations of signals for blind signal separation processing in accordance with the present invention.

The different embodiments of the receive antenna array will now be discussed in greater detail with reference to FIGS. 3-6. Referring now to FIG. 3, array deflection will be discussed. The receive antenna array 142 comprises N antenna elements 143 for generating N initial antenna patterns for receiving N different summations of the M source signals. The receive antenna array 142 also comprises an elevation controller 141 for selectively changing an elevation of at least one of the N initial antenna patterns for generating at least one additional antenna pattern so that at least one additional different summation of the M source signals is received thereby.

A receiver 140 is connected to the receive antenna array 142 and receives the N different summations of the M source signals using the N initial antenna patterns, and also receives the at least one additional different summation of the M source signals using the at least one additional antenna pattern.

A blind signal separation processor 144 is connected to the receiver 140 for forming a mixing matrix 146 comprising the N different summations of the M source signals and the at least one additional different summation of the M source signals. The mixing matrix has a rank equal to N plus the number of additional different summations of the M source signals received using the additional antenna patterns. A resulting rank of the mixing matrix 146 is at least equal to M. The processor 144 separates desired signals from the mixing matrix 146.

In general, any antenna array means which provides signal sums suitable for increasing the rank of the mixing matrix can be utilized with a deflection mechanism. The deflection will generate two distinct and mixing matrix usable signal sums for each of the antenna array means. There is therefore a 2 times multiplier effect by utilization of this technique.

If the array deflection is segmented into K distinct areas associated with an antenna, each of the K areas can provide for 2 independent deflection areas and entries into the mixing matrix. For instance, if the antenna array can provide N summations by itself and there are K distinct deflection areas, the number of signal sums in the mixing matrix may be 2NK.

Figure 4:
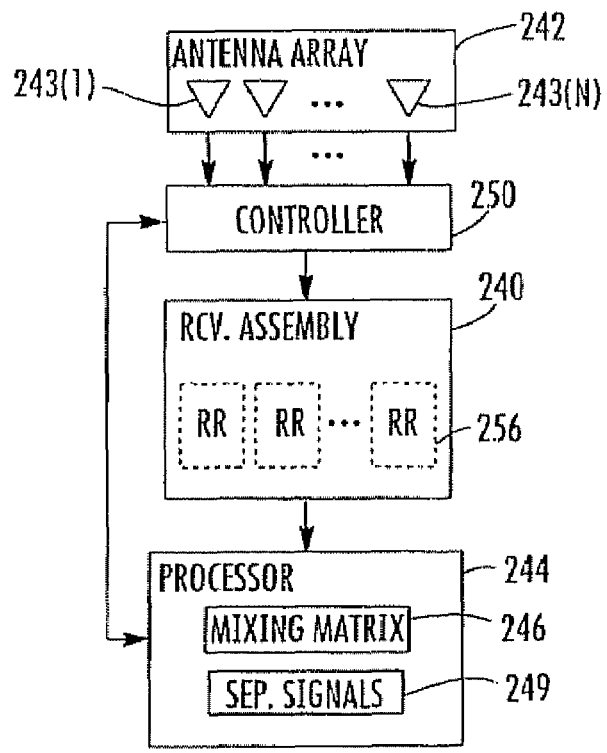
FIG. 4 is a block diagram of a MIMO receiver operating based on path selection for providing different summations of signals for blind signal separation processing in accordance with the present invention.

Separating source signals provided by M signal sources based on path selection will be discussed in reference to FIG. 4. The receive antenna array 242 comprising N elements 243 for forming at least N antenna beams for receiving at least N different summations of the M source signals, with N and M being greater than 2.

A controller 250 is connected to the antenna array 242 for selectively forming the at least N antenna beams. A receiver assembly 240 is connected to the antenna array 242 for receiving the at least N different summations of the M source signals. A blind signal separation processor 244 is connected to the receiver assembly 240 for forming a mixing matrix 246 comprising up to the at least N different summations of the M source signals.

The blind signal separation processor 244 also determines if the different summations of the M source signals are correlated or statistically independent, and if not, then cooperates with the controller 250 for forming different beams for receiving new different summations of the M source signals to replace the different summations of the M source signals that are not correlated or statistically independent in the mixing matrix 246. As a result, at least M different summations of the source signals are received so that the mixing matrix has a rank at least equal to M. The desired source signals are then separated from the mixing matrix 246.

A rake receiver is a radio receiver designed to counter the effects of multipath fading. It does this by using several independent receivers each delayed slightly in order to tune in to the individual multipath components. It can be used by most types of radio access networks. It has been found to be especially beneficial for spreading code types of modulation. Its ability to select specific incident signal paths make it suitable as a means to change the paths fed to the blind signal separation processor 244.

Selectively forming the N antenna beams as discussed above may be applied to all radio access networks, as readily understood by those skilled in the art. For CDMA systems, the receiver assembly 240 comprises N rake receivers 256. Each rake receiver 256 comprises k fingers for selecting k different multipath components for each one of the N different summations of the M source signals received by the respective antenna element connected thereto. In this configuration, the blind signal separation processor 244 is connected to the N rake receivers 256 for forming the mixing matrix 246. The mixing matrix 246 comprises up to at least kN different multipath components of the at least N different summations of the M source signals, and the mixing matrix has a rank equal up to kN, where kN is at least equal to M.

In particular, when CDMA waveforms propagate they often encounter multiple paths from the source to the destination. A rake receiver 256 is specifically designed to capture a number of these individual instances and combine them for a more robust signal decoding. While the original signal propagates along each path, its properties are modified by the unique characteristics of the path. In some circumstances, the modification to the correlation and/or statistical properties of the received signal will be large enough so that they can be treated as separable signal streams. A modified rake receiver 256 could be used to extract each modified stream and feed it as a unique entry into the mixing matrix 246. While this means of increasing the rank will not always be available, it will tend to be available in high multipath environments when it is most likely needed.

While a rake receiver 256 can exploit the different paths, the more general approach applicable to any modulation technique is beam forming. This differs from the rake receiver 256 since beam forming is used for desired signal enhancement as well as desired signal rejection. The difference however is that the rejected signal may actually be another version of the signal intended for the receiver. However, the receiver assembly 240 needs to detect a number of these unique propagation path versions of the same signal in order to build the mixing matrix 246 to a sufficient rank.

Signal splitting is also used for further populating the mixing matrix A. In one approach, the summation signals are split using spreading codes. In another approach, the summation signals are split using in-phase (I) and quadrature(Q) modules.

Figure 5:
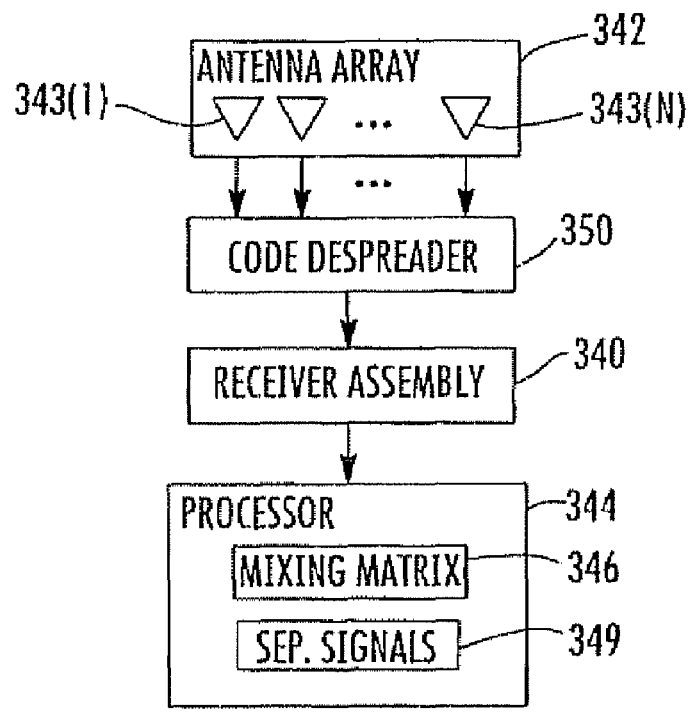
FIG. 5 is a block diagram of a MIMO receiver operating based on spreading codes for providing additional summations of signals for blind signal separation processing in accordance with the present invention.

Signal splitting using spreading codes will now be discussed in reference to FIG. 5. The receive antenna array 342 comprising N antenna elements 343 for receiving at least N different summations of the M source signals. A code despreader 350 is connected to the N antenna elements 343 for decoding the at least N different summations of the M source signals. Each one of the N different summations includes k codes for providing k different summations of the M source signals associated therewith.

A receiver assembly 340 is connected to the code despreader 350 for receiving at least kN different summations of the M source signals. A blind signal separation processor 344 is connected to the receiver assembly 340 for forming a mixing matrix 346 comprising the at least kN different summations of the M source signals. The mixing matrix 346 has a rank equal up to kN, with a resulting rank at least being equal to M. The blind signal separation processor 344 separates desired source signals from the mixing matrix 346.

Depending on the modulation of the received signals, the above described signal splitting may be used for increasing the rank of the mixing matrix without increasing the number N of antenna elements. CDMA IS-95, CDMA2000 and WCDMA are examples of spread spectrum communications systems in which spreading codes are used. A common thread is that a unique code is processed with each signal to spread the data over a larger frequency band.

The same spreading code is processed with the received signal sum (desired signal, undesired signals and unknown noise sources). This causes the desired signal to be reconstructed back to its original frequency bandwidth, while the interferers are spread over the wide frequency band.

The above listed CDMA implementations actually have many signal streams simultaneously using the same frequency band. Each signal stream uses a code that is ideally orthogonal to all the others. If this condition is met at the decoder, it means that only the signal of interest will be despread.

There often is some correlation between the CDMA signals, so the interfering signals are somewhat reconstructed along with the desired signal. This is often due to the delay experienced by the individual signals, and also the multipath occurrences of the signals. Some of the undesired signals, especially the CDMA ones, will increase in value. The increase will not be as significant as for the desired signal, but it will still increase the overall noise value, and therefore decrease the signal-to-noise ratio.

The form of the despread signals equation and the signals themselves meet the criteria for blind signal separation processing. In fact, if one of the dispreading codes is individually applied for each known signal received by the receiver assembly 340, individual summations that meet the ICA model requirements are obtained.

Therefore, there are as many row entries available for the mixing matrix as known codes, assuming of course, that they each produce linearly independent significant value. Under the right circumstances this will allow an increase of the mixing matrix to a value greater than the number of codes. For example, N antenna elements and M codes may provide NM matrix rows.

For illustrative purposes, 3 codes are assumed known and the 3 known code signals retain their orthogonality. In the code despreader 350, the mixing matrix A has top 3 rows and bottom 3 rows each due to an antenna stream after each stream has been despread by the 3 known codes. The off diagonal 0 values are due to the orthogonality of the codes. The column entries 4, 5 and 6 are for the general case of unknown signals of the same index.

$$\begin{bmatrix} x_1 \\ x_2 \\ x_3 \\ x_4 \\ x_5 \\ x_6 \end{bmatrix} = \begin{bmatrix} a_{11} & 0 & 0 & a_{14} & a_{15} & a_{16} \\ 0 & a_{22} & 0 & a_{24} & a_{25} & a_{26} \\ 0 & 0 & a_{33} & a_{34} & a_{35} & a_{36} \\ a_{41} & 0 & 0 & a_{44} & a_{45} & a_{46} \\ 0 & a_{52} & 0 & a_{54} & a_{55} & a_{56} \\ 0 & 0 & a_{63} & a_{64} & a_{56} & a_{66} \end{bmatrix} \begin{bmatrix} s_1 \\ s_2 \\ s_3 \\ s_4 \\ s_5 \\ s_6 \end{bmatrix}$$

The signals corresponding to the column entries 4, 5 and 6 can be other path versions of the known codes, or other cell signals of unknown codes. Also, one signal may be Gaussian and the other signal is either CDMA signal groups obeying the central limit theorem so that they appear as a single Gaussian signal, e.g., release 4 channels. In other words, a sufficient amount of non-random signals will add up to a Gaussian signal. The interferers may be non-Gaussian signal sources or at most one Gaussian signal unknown to the network.

After despreading the known codes in the code despreader 350, the blind signal separation processor 344 receives a mixing matrix 346 of rank 6. The rank of 6 is derived based upon 2 antenna elements multiplied by a factor of 3 since 3 codes are known.

The 6 signals are applied to the blind signal separation processor 344 wherein the mixing matrix 346 having a rank of 6 is formed. The blind signal separation processor 344 determines the separation matrix W from only the received signals modified by the channels: x=As, where A is the mixing matrix. In the illustrated example, 6 signals are separable.

The blind signal separation processor 344 selects the signals to be decoded. For example, the interferer signals may be dropped and all versions of the desired signals are selected. The selected signals are applied to a demodulator module for demodulation. The demodulator uses well known equalization techniques that combine the multipath versions of the same signal.

In the more general case the off diagonal values are shown as 0 above for simplicity, could actually be nonzero. This would be the more usual case when the correlation properties between the coded signals are not perfect. This would represent additional noise to each separated signal. However, as previously shown the rank of the matrix is sufficient to separate these signals, so their value will be significantly reduced after the blind signal separation processing. This leads to a decrease in noise, an increase in signal to noise ratio, and as indicated by Shannon's law an increase in channel capacity.

Figure 6:
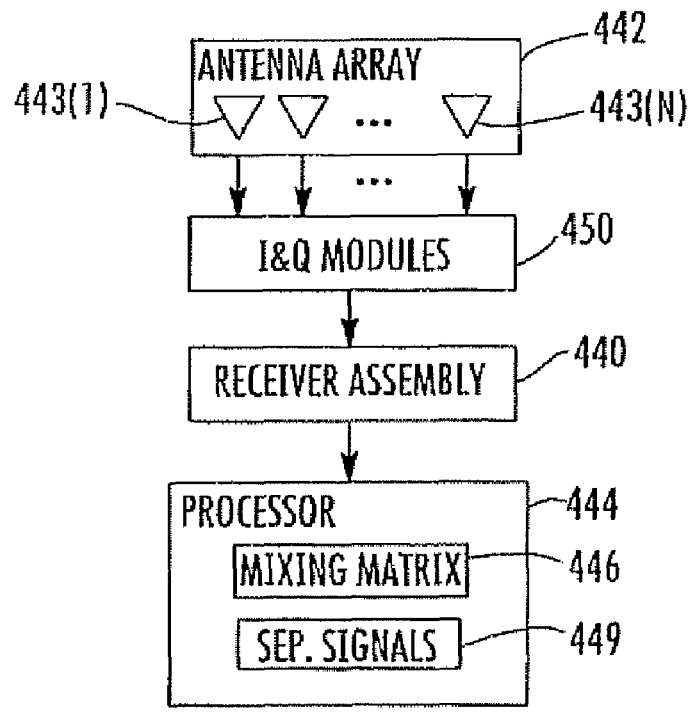
FIG. 6 is a block diagram of a MIMO receiver operating based on in-phase and quadrature signal components for providing additional summations of signals for blind signal separation processing in accordance with the present invention.

Referring now to FIG. 6, the other approach for increasing the rank of the mixing matrix A without increasing the number N of antenna elements is to separate a received mixed signal into its in-phase (I) and quadrature (Q) components. I and Q components of a coherent RF signal are components whose amplitudes are the same but whose phases are separated by 90 degrees.

The receive antenna array 442 comprising N antenna elements 443 for receiving at least N different summations of the M source signals. A respective in-phase and quadrature module 450 is downstream to each antenna element 443 for separating each one of the N different summations of the M source signals received thereby into an in-phase and quadrature component set.

A receiver assembly 440 is downstream to each in-phase and quadrature module 450 for receiving the at least N in-phase and quadrature component sets for the at least N different summations of the M source signals. A blind signal separation processor 444 is downstream to the receiver assembly 440 for forming a mixing matrix 446 comprising at least 2N different summations of the M source signals. Each in-phase and quadrature component set provides 2 inputs into the mixing matrix 446. The mixing matrix 446 has a rank equal up to 2N, and the blind signal separation processor 444 separates desired source signals 514 from the mixing matrix 512.

By separating the received mixed signals into I and Q components, the size of the mixing matrix increases by a factor of 2. As long as the I and Q components are encoded with different data streams, then the mixed signal received at any antenna element may be split into two different mixed signals.

In the case of differential encoding the nature of the modulation needs to be analyzed to determine if I and Q meet the linearity requirement. For instance, it has been shown for GSM that the GMSK encoding can be assumed linear when used with appropriate filtering, and processed in the receiver as if it were BPSK encoding. Since BPSK meets the requirements for blind signal separation processing, the I and Q process described can be used.

I and Q components can be used with any of the above described antenna array embodiments to populate the mixing matrix A. When I and Q is used, the mixing matrix A can be populated as if 2 times the number of antenna elements were used. The antenna elements could be of any diversity form such as uncorrelated, correlated or polarized. The N antenna elements with each element's signal sum split into I and Q components provides for 2N independent mixed signal sums. As a result, the rank of the mixing matrix is 2N, where 2N is at least equal to or greater than M.

This mechanism could also be used with the antenna array deflection technique to create more sums of signals. Each of these sums could in turn also be separated into I and Q components. A factor of 2 from I and Q, N antenna elements, and K deflections areas for the antenna array would provide 2KN sums for the mixing matrix.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A multiple-input multiple-output (MIMO) communications system comprising:
    a transmitter configured to transmit M source signals;
    a transmit antenna array connected to said transmitter and comprising M antenna elements for transmitting the M source signals;
    a receive antenna array comprising N antenna elements for receiving at least M different summations of the M source signals, with N being less than M; a receiver connected to said receive antenna array and configured to receive the at least M different summations of the M source signals; and
    a signal separation processor connected to said receiver for forming a mixing matrix comprising the at least M different summations of the M source signals so that the mixing matrix has a rank equal to at least M;
    said signal separation processor for separating desired source signals from the mixing matrix based on a knowledge based processing signal extraction process, with the knowledge based signal separation process separating the desired source signals from the mixing matrix based on at least one of a zero forcing (ZF) process, and a minimum mean squared estimation (MMSE) process.

2. A MIMO communications system according to claim 1 wherein L interferer source signals exist and interfere with separation of the desired source signals from the mixing matrix, with L being greater than 1; wherein said mixing matrix also increase its rank by L sums in addition to the M different summations of the M source signals so that the mixing matrix has a rank equal to at least M+L.

3. A MIMO communications system according to claim 1 wherein said receive antenna array comprises N correlated antenna elements for forming a phased array.

4. A MIMO communications system according to claim 1 wherein said receive antenna array comprises N correlated antenna elements, said N correlated antenna elements comprising at least one active antenna element and up to N−1 passive antenna elements for forming a switched beam antenna.

5. A MIMO communications system according to claim 1 wherein each summation of the M source signals is linear.

6. A MIMO communications system according to claim 1 wherein said receive antenna array comprises N correlated antenna elements, and wherein at least two of said N correlated antenna elements have different polarizations.

7. A MIMO communications system according to claim 6 wherein the different polarizations are orthogonal to one another.

8. A MINO communications system according to claim 1 wherein said receive antenna array generates N initial antenna patterns for receiving at least N different summations of the M source signals; and further comprising an elevation controller connected to said receive antenna array for selectively changing an elevation of at least one of the N initial antenna patterns so that at least one additional different antenna pattern is generated for receiving at least one additional summation of the N source signals; and wherein the mixing matrix further comprises the at least one additional different summation of the M source signals, the mixing matrix having a rank equal to N plus the number of additional different summations of the M source signals received using the additional antenna patterns, with a resulting rank at least being equal to M.

9. A MIMO communications system according to claim 1 wherein said receive antenna array generates at least N antenna beams for receiving at least N different summations of the M source signals, with N and M being greater than 2; and further comprising a controller connected to said receive antenna array for selectively forming the at least N antenna beams; said signal separation processor also
determining if the different summations of the M source signals are correlated or statistically independent, and if not, then
cooperating with said controller for forming different beams for receiving new different summations of the M source signals to replace the different summations of the M source signals that are not correlated or statistically independent in the mixing matrix so that the rank is at least equal to M.

10. A MIMO communications system according to claim 1 further comprising a code despreader connected to said N antenna elements for decoding at least N different summations of the M source signals, each one of the N different summations including k codes for providing k different summations; wherein said receiver is connected to said despreader for receiving at least KN different summations of the M source signals; and wherein said signal separation processor forms the mixing matrix comprising the at least kN different summations of the M source signals, with a resulting rank at least being equal to M.

11. A MINO communications system according to claim 1 further comprising respective in-phase and quadrature module connected downstream to each antenna element in said receive antenna array for separating each one of the M different summations of the M source signals received thereby into an in-phase and quadrature component set; and wherein said signal separation processor forms the mixing matrix comprising at least 2N different summations of the M source signals, with each in-phase and quadrature component set providing 2 inputs into the mixing matrix, with a resulting rank at least being equal 2N, where 2N is at least equal to M.

12. A MIMO communications system according to claim 1 wherein said signal separation processor separates the desired source signals from the mixing matrix based on a combination of a knowledge based signal extraction process and a blind signal separation process.

13. A MIMO communications system according to claim 1 wherein each summation of the N source signals is linear.

14. A MIMO communications system according to claim 1 wherein said receive antenna array comprises N correlated antenna elements, and wherein at least two of said N correlated antenna elements have different polarizations.

15. A method for operating a multiple-input multiple-output (MIMO) communications system comprising:
operating a transmitter configured to transmit M source signals;
transmitting the M source signals from a transmit antenna array connected to a transmitter, the transmit antenna array comprising M antenna elements;
receiving at a receive antenna array at least M different summations of the M source signals, with N being less than M, the receive antenna array comprising N antenna elements; and
providing the at least M different summations of the M source signals to a receiver; and
processing by a signal separation processor connected to the receiver the at least M different summations of the M source signals, the processing comprising
forming a mixing matrix comprising the at least M different summations of the M source signals so that the mixing matrix has a rank equal to at least M, and
separating desired source signals from the mixing matrix based on a knowledge based processing signal extraction process, with the knowledge based signal separation process separating the desired source signals from the mixing matrix based on at least one of a zero forcing (ZF) process, and a minimum mean squared estimation (MMSE) process.

16. A method according to claim 15 wherein L interferer source signals exist and interfere with separation of the desired source signals from the mixing matrix, with L being greater than 1; further comprising L additional sums in addition to the at least M different summations of the M source signals so that mixing matrix has a rank equal to at least M+L.

17. A method according to claim 15 wherein the receive antenna array comprises N correlated antenna elements for forming a phased array.

18. A method according to claim 15 wherein the receive antenna array comprises N correlated antenna elements, the N correlated antenna elements comprising at least one active antenna element and up to N−1 passive antenna elements for forming a switched beam antenna.

19. A method according to claim 15 wherein the receive antenna array comprises N correlated antenna elements, and wherein at least two of the N correlated antenna elements have different polarizations.

20. A method according to claim 15 wherein the receive antenna array generates N initial antenna patterns for receiving at least N different summations of the M source signals; and further comprising an elevation controller connected to the receive antenna array for selectively changing an elevation of at least one of the N initial antenna patterns so that at least one additional different antenna pattern is generated for receiving at least one additional summation of the M source signals; and wherein the mixing matrix further comprises the at least one additional different summation of the M source signals, the mixing matrix having a rank equal to N plus the number of additional different summations of the M source signals received using the additional antenna patterns, with a resulting rank at least being equal to M.

21. A method according to claim 15 wherein the receive antenna array generates at least N antenna beams for receiving at least N different summations of the M source signals, with N and M being greater than 2; and further comprising a controller connected to the receive antenna array for selectively forming the at least N antenna beams; the blind signal separation processor also
  determining if the different summations of the M source signals are correlated or statistically independent, and if not, then
  cooperating with the controller for forming different beams for receiving new different summations of the M source signals to replace the different summations of the M source signals that are not correlated or statistically independent in the mixing matrix so that the rank is at least equal to M.

22. A method according to claim 15 further comprising a code despreader connected to the N antenna elements for decoding the at least N different summations of the N source signals, each one of the N different summations including k codes for providing k different summations; wherein the receiver is connected to the despreader for receiving at least kN different summations of the N source signals; and wherein the blind signal separation processor forms the mixing matrix comprising the at least kN different summations of the M source signals, with a resulting rank at least being equal to M.

23. A method according to claim 15 further comprising a respective in-phase and quadrature module connected downstream to each antenna element in the receive antenna array for separating each one of the M different summations of the M source signals received thereby into an in-phase and quadrature component set; and wherein the blind signal separation processor forms the mixing matrix comprising at least 2N different summations of the M source signals, with each in-phase and quadrature component set providing 2 inputs into the mixing matrix, with a resulting rank at least being equal 2N, where 2N is at least equal to M.

24. A method according to claim 15 wherein separating the desired source signals from the mixing matrix is based on at least one of a knowledge based signal extraction process and a blind signal separation process.

25. A multiple-input multiple-output (MIMO) communications system comprising:
  a transmitter configured to transmit M source signals;
  a transmit antenna array connected to said transmitter and comprising M antenna elements for transmitting the M source signals;
  a receive antenna array comprising N antenna elements for receiving at least M different summations of the M source signals, with N being less than M; a receiver connected to said receive antenna array and configured to receive the at least M different summations of the M source signals; and
  a signal separation processor connected to said receiver for forming a mixing matrix comprising the at least M different summations of the M source signals so that the mixing matrix has a rank equal to at least M;
  said signal separation processor comprising a blind signal separation processor for separating desired source signals from the mixing matrix, wherein separating the desired source signals from the mixing matrix is based on at least one of principal component analysis (PCA), independent component analysis (ICA), and single value decomposition (SVD).

26. A MIMO communications system according to claim 25 wherein said receive antenna array comprises N correlated antenna elements for forming a phased array.

27. A MIMO communications system according to claim 25 wherein said receive antenna array comprises N correlated antenna elements, said N correlated antenna elements comprising at least one active antenna element and up to N−1 passive antenna elements for forming a switched beam antenna.

28. A method for operating a multiple-input multiple-output (MIMO) communications system comprising:
  operating a transmitter configured to transmit M source signals;
  transmitting the M source signals from a transmit antenna array connected to a transmitter, the transmit antenna array comprising M antenna elements;
  receiving at a receive antenna array at least M different summations of the M source signals, with N being less than M, the receive antenna array comprising N antenna elements; and
  providing the at least M different summations of the M source signals to a receiver; and
  processing by a blind signal separation processor connected to the receiver the at least M different summations of the M source signals, the processing comprising
    forming a mixing matrix comprising the at least M different summations of the M source signals so that the mixing matrix has a rank equal to at least M, and
    separating desired source signals from the mixing matrix, wherein separating the desired source signals from the mixing matrix is based on at least one of principal component analysis (ECA), independent component analysis (ICA), and single value decomposition (SVD)

29. A method according to claim 28 wherein L interferer source signals exist and interfere with separation of the desired source signals from the mixing matrix, with L being greater than 1; further comprising L additional sums in addition to the at least N different summations of the N source signals so that mixing matrix has a rank equal to at least M+L.

30. A method according to claim 28 wherein the receive antenna array comprises N correlated antenna elements for forming a phased array.

31. A method according to claim 28 wherein the receive antenna array comprises N correlated antenna elements, the N correlated antenna elements comprising at least one active antenna element and up to N−1 passive antenna elements for forming a switched beam antenna.

* * * * *

UNITED STATES PATENT AND TRADEMARK OFFICE
CERTIFICATE OF CORRECTION

PATENT NO. : 7,627,052 B2 Page 1 of 1
APPLICATION NO. : 11/326042
DATED : December 1, 2009
INVENTOR(S) : Steven J. Goldberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,627,052 B2 | |
| APPLICATION NO. | : 11/326042 | |
| DATED | : December 1, 2009 | |
| INVENTOR(S) | : Goldberg | |

It is certified that error appears in the above-identified patent and that said Letters Patent is hereby corrected as shown below:

Column 2, Line 51    Delete: "separates"
                     Insert: -- separate --

Column 3, Line 49    Delete: "additional"
                     Insert: -- addition --

Column 4, Line 34    Delete: "receiver 30"
                     Insert: -- receiver 40 --

Column 4, Line 39    Delete: "he"
                     Insert: -- The --

Column 5, Line 62    Delete: "is create"
                     Insert: -- is to create --

Column 6, Line 5     Delete: "form"
                     Insert: -- from --

Column 8, Line 28    Delete: "array means which"
                     Insert: -- array which --

Column 10, Line 60   Delete: "0 0 a63 a64 a56 a66"
                     Insert: -- 0 0 a63 a64 a65 a66 --

Column 13, Line 21   Delete: "N"
                     Insert: -- M --

Column 13, Line 54   Delete: "MINO"
                     Insert: -- MIMO --

Signed and Sealed this
Twenty-fifth Day of September, 2012

David J. Kappos
*Director of the United States Patent and Trademark Office*

CERTIFICATE OF CORRECTION (continued)
U.S. Pat. No. 7,627,052 B2

Column 15, Line 19    Delete: "N"
                                      Insert: -- M --

Column 15, Line 23    Delete: "N"
                                        Insert: -- M --

Column 15, Line 46    Delete: "N"
                                        Insert: -- M --

Column 16, Line 39    Delete: "ECA"
                                        Insert: -- PCA --